United States Patent [19]

Noland

[11] 4,082,524
[45] Apr. 4, 1978

[54] SELF-CLEANING FILTER

[76] Inventor: Richard D. Noland, 2208 W. 56th, Mission Hills, Kans. 66208

[21] Appl. No.: 779,354

[22] Filed: Mar. 21, 1977

[51] Int. Cl.² .......................................... B01D 46/12
[52] U.S. Cl. ................................. 55/294; 15/312 R; 55/483; 55/484; 55/529
[58] Field of Search .............................. 55/294–296, 55/299, 301, 493, 483, 484, 511, 529; 210/413, 495; 15/312 R, 415 R

[56] References Cited

U.S. PATENT DOCUMENTS

| Re. 19,260 | 7/1934 | Shurtleff | 55/493 X |
| 962,324 | 6/1910 | Deming | 210/495 X |
| 3,377,780 | 4/1968 | Noland | 55/294 |
| 3,472,002 | 10/1969 | Brown et al. | 55/294 X |
| 3,545,180 | 12/1970 | Schrag | 55/294 X |
| 3,550,357 | 12/1970 | Bowen et al. | 55/294 X |
| 4,036,613 | 7/1977 | Brown et al. | 55/294 |

Primary Examiner—Frank W. Lutter
Assistant Examiner—Kathleen J. Prunner
Attorney, Agent, or Firm—Lowe, Kokjer, Kircher, Wharton & Bowman

[57] ABSTRACT

A self-cleaning filter for a particulate-laden gas stream. A circular filter surface is positioned in the gas stream exhaust and includes a centrally mounted drive train. An elongate rotor transverses the face of the filter surface and is centrally coupled by a flexible joint to the drive train for rotative drive. Wheels mounted on each end of the rotor engage a circular track at the periphery of the filter surface; one wheel is spring biased to continually force the wheel at the opposite end of the rotor against the track. A vacuum cleaning head is associated with the arm of the rotor opposite the spring biased wheel to remove particulate matter collected on the filter surface.

2 Claims, 7 Drawing Figures

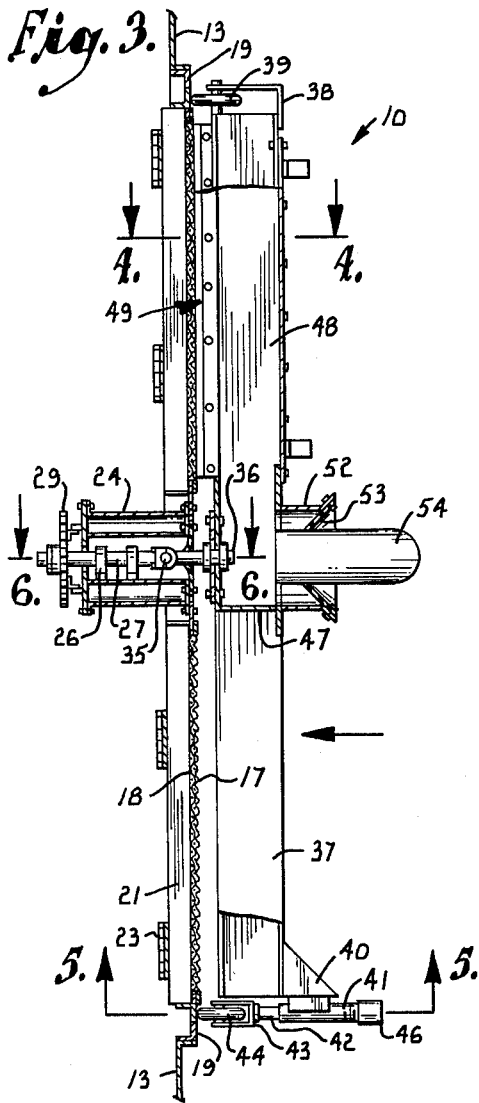
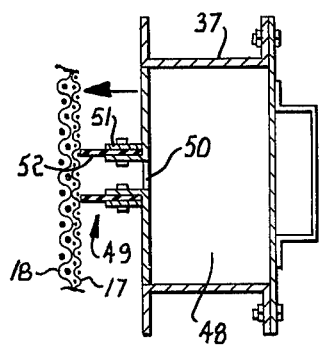
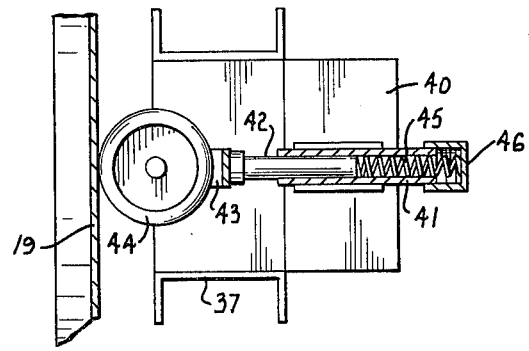
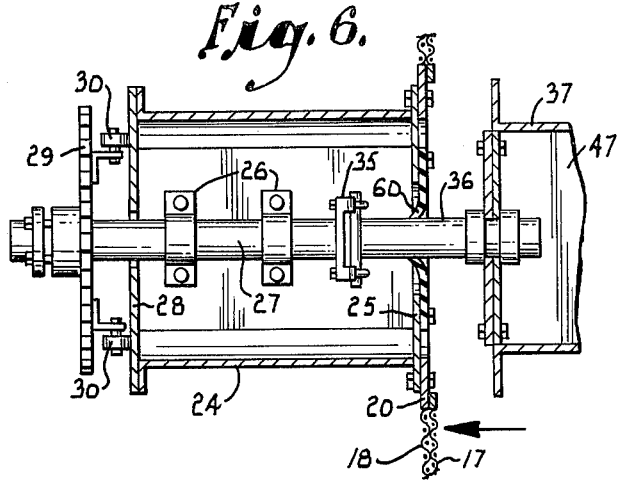
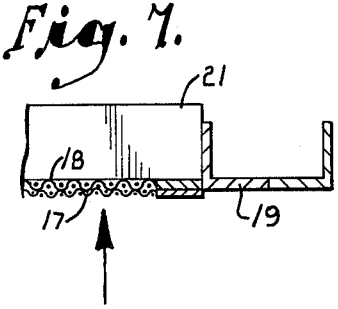

SELF-CLEANING FILTER

BACKGROUND AND SUMMARY OF THE INVENTION

This invention relates to a filter for removal of particulate matter from an air stream. More particularly, the invention relates to a self-cleaning filter.

In various types of equipment there is frequently generated a gas stream laden with dust and particulate matter. In a grain dryer, for example, warm air circulating through the grain entrains particles which might then be discharged to the atmosphere. Recent emphasis on environmental quality, however, has prompted the search for new and improved air polution control methods. One technique for efficiently controlling air pollution to which this invention particularly relates has been the separation of unwanted particulate matter from a gas stream by a filter media. A filter screen is typically placed in the gas stream exhaust and dust simply collects on the filter surface as the gas passes through the filter.

To permit continuous operation of the equipment, it is known to provide a vacuum sweep arm which travels over the filter surface and removes the collected material. An example of such equipment is shown in my earlier U.S. Pat. No. 3,377,780, issued Apr. 16, 1968 and entitled "Self-Cleaning Filter Apparatus". Equipment of this genre includes a circular filter screen placed in the exhaust gas stream with a centrally supported vacuum sweep arm which angularly rotates about the center of the filter to continuously clean the surface. Although generally effective in its cleaning function, this equipment has not been without drawbacks.

Heretofore it has been necessary, for example, to maintain the filter surface in a rigid and perfectly flat plane in order to insure effective cleaning of the surface since the vacuum arm rotates in a flat plane. Should the filter become warped in any way, the vacuum arm cannot maintain contact with the warped section and only partial cleaning results. Thus significant attention is devoted to provide extensive structural support to maintain a perfectly flat filter surface. Similarly, adjustments to, and support of, the vacuum arm are critical to insure appropriate contact of the cleaning head with the filter surface.

Needless to say, the structural framework, supports and bracing needed for these considerations are costly additions to the equipment. Such structural details are reflected in two other areas in addition to cost. First, shipping of the filter apparatus to the job site is a handicap. Because of the critical relationship between the vacuum arm and the filter surface, the filter apparatus is normally preassembled by the manufacturer and then shipped as a single unit, albeit a bulky and cumbersome one, for installation. Secondly, space limitations on the filter equipment may be imposed by the dimensions and configurations of the grain dryer or other equipment on which the filter is to be installed. Accordingly, it is easily seen that some applications are severly limited by the size of the filter apparatus. The framework and structural components have of course been the chief contributors to the significant size of such equipment.

The primary goal of this invention is to provide a self-cleaning filter of reliable construction, possessing superior characteristics of operation and manufacture, and which is free of the limitations and drawbacks of filters heretofore found in the industry.

More particularly, an object of the invention is to provide a self-cleaning filter with emphasis on economy. Excess structural components are eliminated to reduce both the manufacturing cost and size of the equipment. As a corollary advantage, the filter may be employed in a broader spectrum of applications where size of the filter apparatus must be maintained at a minimum.

Another object of the invention is to provide a self-cleaning filter apparatus which may be shipped to the job site in a disassembled condition to minimize both bulk and expense. Thereafter, the equipment may be easily installed in the exhaust gas stream of the plant.

An additional object of the invention is to provide a self-cleaning filter which relies upon the structural integrity of the grain dryer or associated equipment for support of the filter surface. Thus is eliminated the necessity for an elaborate support and bracing system commonly associated with filter apparatus of this type.

A further object of the invention is to provide a self-cleaning filter wherein the filter surface need not be maintained in a rigid, flat plane to insure effective cleaning. Herein provided is a vacuum rotor arm with a cleaning head especially adapted to sweep an undulating or warped surface to remove particulate matter collected thereon.

Yet another object of the invention is to provide a self-cleaning filter of the character described which may be fabricated in a variety of sizes without requisite changes in the drive and vacuum connections. In other words, dimensional changes are demanded only for the filter itself and the associated vacuum arm when a size change is required.

Other and further objects of the invention, together with the features of novelty appurtenant thereto, will appear in the course of the following description of the drawings.

DESCRIPTION OF THE DRAWINGS

In the accompanying drawings, which form a part of the specification and are to be read in conjunction therewith, and in which like reference numerals are employed to indicate like parts in the various views:

FIG. 3 is a side sectional view of the filter taken along line 3—3 of FIG. 2 in the direction of the arrows;

FIG. 4 is an enlarged sectional view through the vacuum rotor taken along line 4—4 of FIG. 3 in the direction of the arrows;

FIG. 5 is an enlarged end view, partly sectional, taken along line 5—5 of FIG. 3 in the direction of the arrows;

FIG. 6 is an enlarged view of the drive train taken along line 6—6 of FIG. 3 in the direction of the arrows; and FIG. 7 is an enlarged sectional view of the outer edge of the filter taken along line 7—7 of FIG. 2 in the direction of the arrows.

Figure 1:
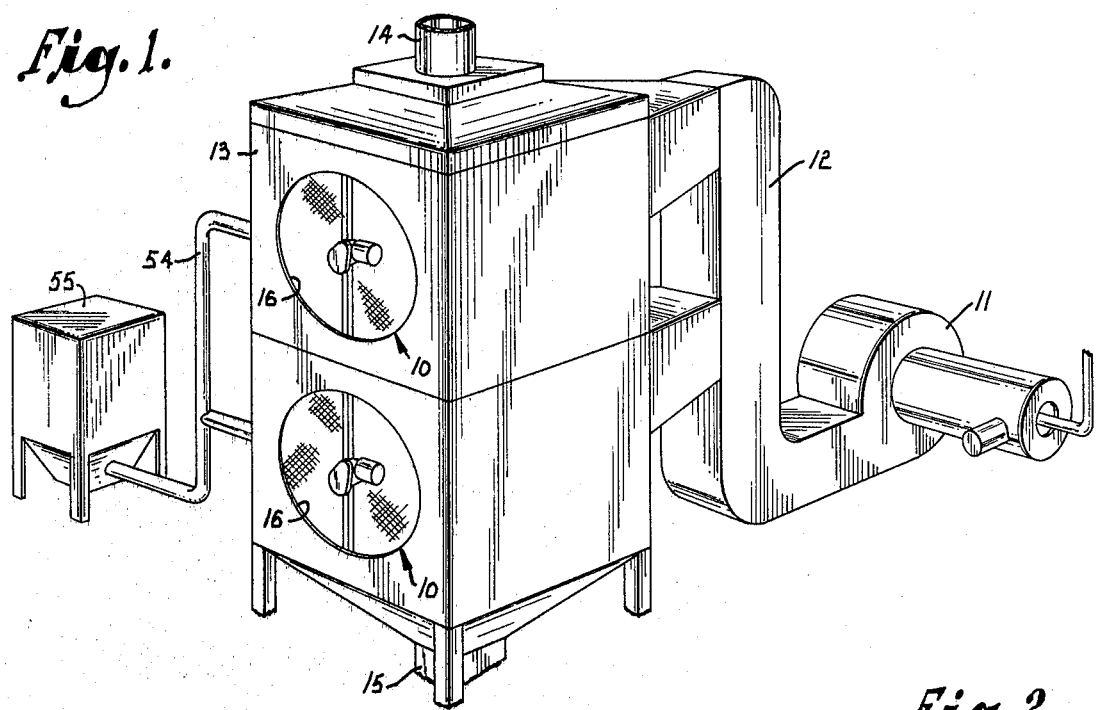
FIG. 1 is a perspective view of a conventional grain dryer shown fitted with a pair of filters constructed in accordance with a preferred embodiment of the invention.

Referring to the drawings in greater detail, a pair of self-cleaning filters, each generally designated by the numeral 10, is shown in FIG. 1 installed in conventional grain drying equipment. The latter equipment includes an air heating and blower unit 11 for delivering air through ducts 12 to the grain dryer housing 13. The housing 13 includes a grain inlet 14 leading to a grain rack (not shown) interiorly of the housing 13 and an outlet 15 through which grain exits in a dry condition. Air passing through the grain rack entrains particulate matter which, but for the filter 10 to be described, would be exhausted to the atmosphere through discharge ports 16 in the housing 13.

Figure 2:
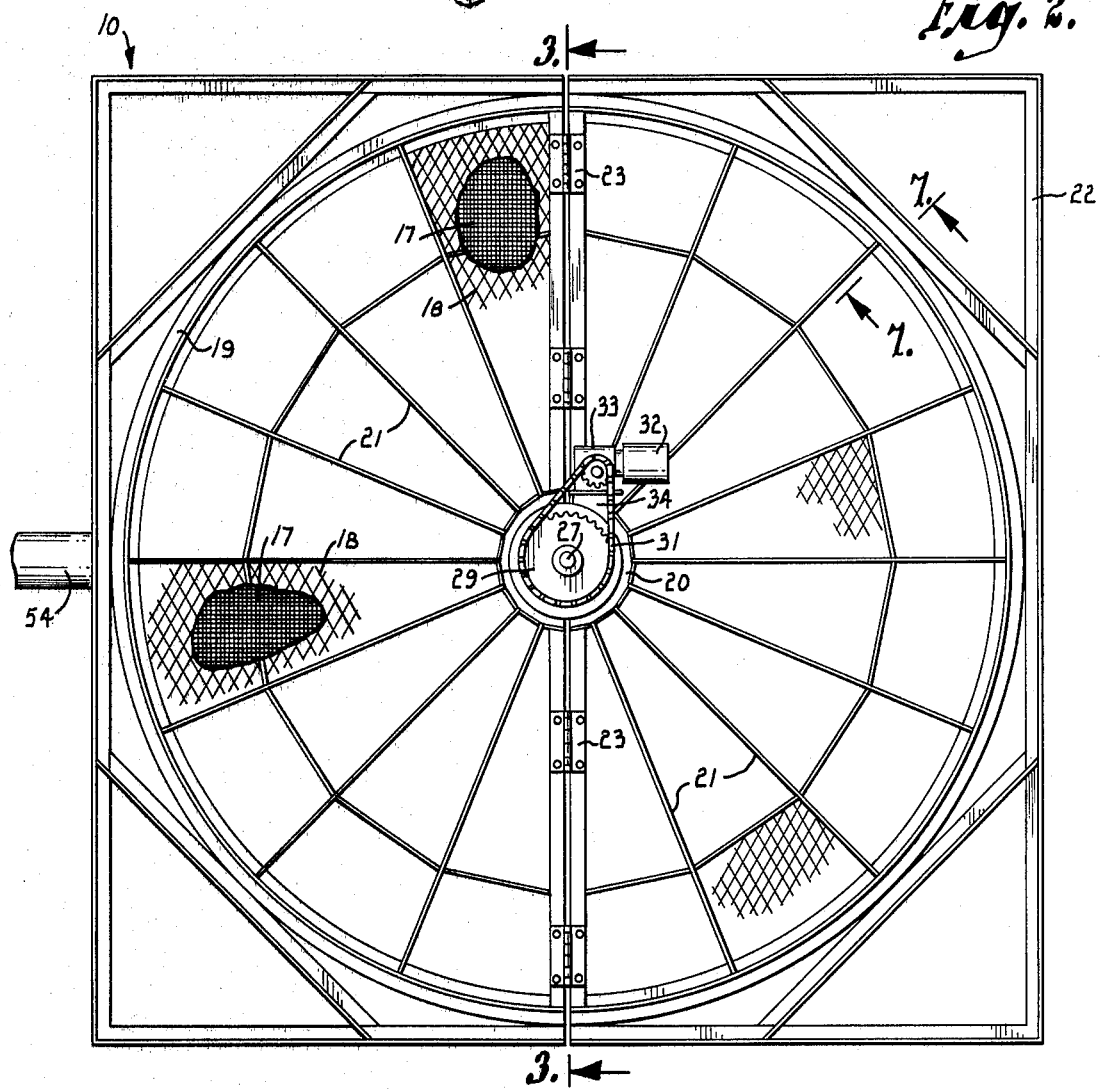
FIG. 2 is a front elevational view of the filter.

Turning then to the details of the filter 10 itself, attention is first directed to FIGS. 2 and 3. The filter 10 includes a circular donut-shaped filter screen 17 on the flow facing side of the filter (flow being indicated by an arrow in FIGS. 3–7) backed by an expanded metal grid or mesh 18 providing support for the screen 17. A circular track 19 is joined (FIG. 7) to the outer edge of the screen 17 and mesh 18. Centrally of the filter 10, the inner edges of the screen 17 and mesh 18 are joined to a circular plate 20 having an open center. On the exhaust side of the filter, support spokes 21 radiate outwardly from the center plate or ring 20 to be joined to the circular track 19 and mesh 18 to provide structural rigidity. Also connected to the circular track 19 is a substantially square frame 22 for bolting the filter 10 to the grain dryer housing 13.

The filter assembly (i.e., filter screen 17, mesh 18, track 19, center ring 20, support bracing 21 and framework 22 described thus far) is formed as identical halves which are connected by a plurality of hinges 23 as shown in FIG. 2 such that the assembly may be folded when disassembled.

Mounted centrally of the filter 10 on the exhaust side thereof is a drive train. With reference to FIG. 6, the drive train includes a cylindrical barrel 24 having an inner end plate 25 bolted to the central ring 20. Within the barrel 24 are supported pillow blocks 26 which carry a drive shaft 27. The outer end of the drive shaft 27 extends through the outer end plate 28 of the barrel 24 and is equipped with a drive sprocket 29. Thrust bearings 30 are mounted on the side of the drive sprocket 29 to rollably engage the outer end plate 28 of the barrel 24. As shown in FIG. 2, a chain 31 is trained around the drive sprocket 29 and is driven by a power means such as motor 32 with an associated gear box 33 supported on the barrel 24 by a mounting pad 34.

Referring again to FIG. 6, the inner end of the drive shaft 27 is coupled by a flexible couple such as universal joint 35 to an extension shaft 36. The extension shaft 36 projects through the inner end plate 25 of the barrel 24 and penetrates a resilient seal 60 which prevents air passage from the flow facing side of the filter 10. The end of the extension shaft 36 projecting to the flow facing side of the filter 10 is coupled to a vacuum rotor arm 37.

The rotor 37 is formed as a box beam which extends entirely across the face of the filter screen 17. To one end of the rotor 37 (the upper end as shown in FIG. 3) is secured an L-shaped bracket 38. A wheel 39 is pinned between the end of the rotor 37 and the bracket 38 to rollably engage the circular track 19 at the periphery of the filter screen 17. The opposite end of the box beam is equipped with a bracket 40 which carries a sleeve 41 oriented substantially perpendicular to the face of the filter 10. The sleeve 41 receives a plunger rod 42 having a yoke 43 on the outer end thereof that carries a rotatable wheel 44. The rotatable wheel 44 engages the circular track 19 at the periphery of the filter screen 17. The sleeve 41 also houses a compression spring 45 acting against the end of the plunger 42 to bias the wheel 44 to engagement with the track 19. The upper end of the sleeve 41 threadably receives an end cap 46 which may be adjusted to vary the spring compression.

The rotor 37 is interiorly divided by a partition 47 to provide a vacuum chamber 48 in one end thereof. A cleaning head 49 is associated with the vacuum chamber 48 portion of the arm. With reference to FIG. 4, the cleaning head 49 includes an elongate slot 50 in the wall of the box beam adjacent the filter screen 17. A channel 51 is secured to the rotor 37 around the mouth of the slot 50 and carries flexible wipers 52 which engage the surface of the filter screen 17.

The rotor 37 is centrally fitted with a transition conduit 52 in axial alignment with the drive shaft 27. As shown in FIG. 3, the mouth of the transition conduit is equipped with a flexible seal 53 penetrated by an elbow of vacuum line or pipe 54. Pipe 54 extends through the grain dryer housing 13 and is connected to conventional vacuum equipment 55 (FIG. 1).

The operational characteristics of the filter 10 are described as follows. It is contemplated that the filter 10 will arrive at the plant site in three separate pieces: the rotor, the preassembled drive train, and the filter assembly folded to conserve space. During installation, the filter assembly is unfolded and the frame 22 thereof is bolted to the grain dryer housing 13 to register over the discharge port 16. Thereafter, the drive train is installed by bolting the end plate 25 to the center ring 20 of the filter assembly. Finally, the rotor is coupled to the extension shaft 36 of the drive train. To complete the installation, a vacuum line 54 penetrates the resilient seal 53 to communicate with the vacuum chamber 48 of the rotor.

During operation of the grain dryer, exhaust gas laden with particulate matter is discharged through the filter with the particulate matter collecting on the surface of the filter screen 17. Powered by the motor 32 through the drive train linkages as previously described and illustrated, the rotor 37 continually rotates over the surface of the filter screen 17; the shaft 36 rotates within seal 60 while the rotor seal 53 permits rotation about fixed pipe 54. A vacuum, provided by a conventional source 55, draws collected particulate matter from the surface of the filter screen 17 between the wipers 52, through slot 50 and into the vacuum chamber 48 of the rotor, from which the particulate matter is removed via the vacuum line 54.

It should be apparent at this point that the filter 10 herein eliminates cantilevered support of a vacuum sweep arm as heretofore found in filters of this nature. That is to say, the rotor 37 positively engages the track 19 at each end thereof. The spring biased wheel 44 causes the cleaning head 49 on the opposite end of the rotor 37 to maintain contact with the surface of the filter screen 17. If a warped surface is encountered, wheel 44 simply reciprocates within the sleeve 41 and continues to bias the opposite wheel 39 to engagement with the track 19, thus insuring contact of the cleaning wipers 52 with the filter screen 17. Slight flexure of the rotor 37 is achieved by providing the universal joint 35 in the drive train.

It should be further noted that the filter 10 eliminates any elaborate support for the drive train and rotor and the filter apparatus relies basically upon the structural integrity of the housing 13 itself. If the housing walls 13 are slightly distorted around the discharge port 16 so as to depart from a perfectly flat plane, no problem is encountered since the spring biased wheel 44 will automatically compensate for any surface irregularities as the rotor 37 sweeps the surface of the filter screen 17.

From the foregoing it will be seen that this invention is one well adapted to achieve all the ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A self-cleaning filter for removing particulate matter from a gas stream flowing through the discharge of a chamber housing, said filter comprising:
    a circular filter mounted over the discharge of said chamber housing;
    a circular track circumscribing said filter;
    a drive train mounted centrally of said filter and including a rotatable drive shaft with a flexible couple positioned substantially perpendicular to said filter;
    an elongate rotor having first and second ends and being centrally coupled by said flexible couple to said drive shaft to transverse said filter, said rotor including a rollable wheel mounted on said first end to engage said circular track and a reciprocally spring biased wheel mounted on said second end to engage said circular track and thereby urge to engagement said rollable wheel on said first end with said circular track, said rotor further including vacuum means associated with said first end to vacuumingly remove particulate matter from said filter; and
    power means connected to said drive train to angularly rotate said rotor over said filter whereby said vacuum means continuously cleans said filter.

2. The self-cleaning filter as in claim 1, wherein said circular filter and said circular track are formed as semicircular halves hingedly connected whereby said halves may be folded when said filter is removed from said chamber housing and is disconnected from said drive train and rotor.

* * * * *